United States Patent [19]
Lawecki et al.

[11] Patent Number: 5,687,542
[45] Date of Patent: Nov. 18, 1997

[54] ISOLATION MODULE FOR MOLDING AND PACKAGING ARTICLES SUBSTANTIALLY FREE FROM CONTAMINANTS

[75] Inventors: Mark Lawecki, Apollo; Eugene A. Gelblum, Mt. Lebanon; Michelle Robinson, Zelienople; Ralph E. Wolstenholme, Westfield; Eugene B. Wolstenholme, Southampton, all of Pa.

[73] Assignee: Medrad, Inc., Pittsburgh, Pa.

[21] Appl. No.: 518,027

[22] Filed: Aug. 22, 1995

[51] Int. Cl.$^6$ ............................................. B65B 55/00
[52] U.S. Cl. .................... 53/122; 53/127; 53/167; 264/232; 264/238; 425/210; 425/317; 425/404; 425/815; 454/187
[58] Field of Search ............... 53/122, 127, 167; 264/232, 238; 425/73, 173, 210, 317, 404, 815; 454/187

[56] References Cited

U.S. PATENT DOCUMENTS

| | | | |
|---|---|---|---|
| 3,105,335 | 10/1963 | Hickey | 53/127 |
| 3,202,084 | 8/1965 | Hale et al. | 53/122 X |
| 3,634,997 | 1/1972 | Tait | 53/122 X |
| 4,267,769 | 5/1981 | Davis et al. | 52/578 X |
| 4,391,080 | 7/1983 | Brody et al. | 53/167 X |
| 4,628,969 | 12/1986 | Jurgens, Jr. et al. | |
| 4,660,464 | 4/1987 | Tanaka | 55/473 X |
| 4,677,980 | 7/1987 | Reilly et al. | |
| 4,718,463 | 1/1988 | Jurgens, Jr. et al. | |
| 4,880,581 | 11/1989 | Dastoli et al. | 264/238 X |
| 4,987,673 | 1/1991 | Kogura et al. | 454/58 X |
| 5,015,425 | 5/1991 | Mimata et al. | 425/225 X |
| 5,141,430 | 8/1992 | Maus et al. | 425/437 X |
| 5,316,560 | 5/1994 | Krone-Schmidt et al. | 454/187 X |
| 5,383,858 | 1/1995 | Reilly et al. | |

FOREIGN PATENT DOCUMENTS 877372   9/1961   United Kingdom ................. 53/122

OTHER PUBLICATIONS

Clean Room Engineering, pp. 2–3, Clean Room Products, Inc.

*Primary Examiner*—Daniel Moon
*Attorney, Agent, or Firm*—Gretchen Platt Stubenvoll

[57] ABSTRACT

An apparatus and method are provided for manufacturing articles, such as syringe barrels, substantially free from contaminants. The apparatus is an enclosure defining at least a class 100 and MCB-3 environment, and includes a molding isolation module and a packaging isolation module. Any contaminants that may exist within the enclosure are removed by the use of horizontal and vertical laminar airflows directed into air filter units. Further, the molding temperature may be selected such that it renders the fabricated articles substantially free from contaminants. The molding isolation module and packaging isolation module keep the fabricated articles substantially free from contaminants from the time the articles are molded to the time the articles are placed in sealed containers for shipment.

30 Claims, 8 Drawing Sheets

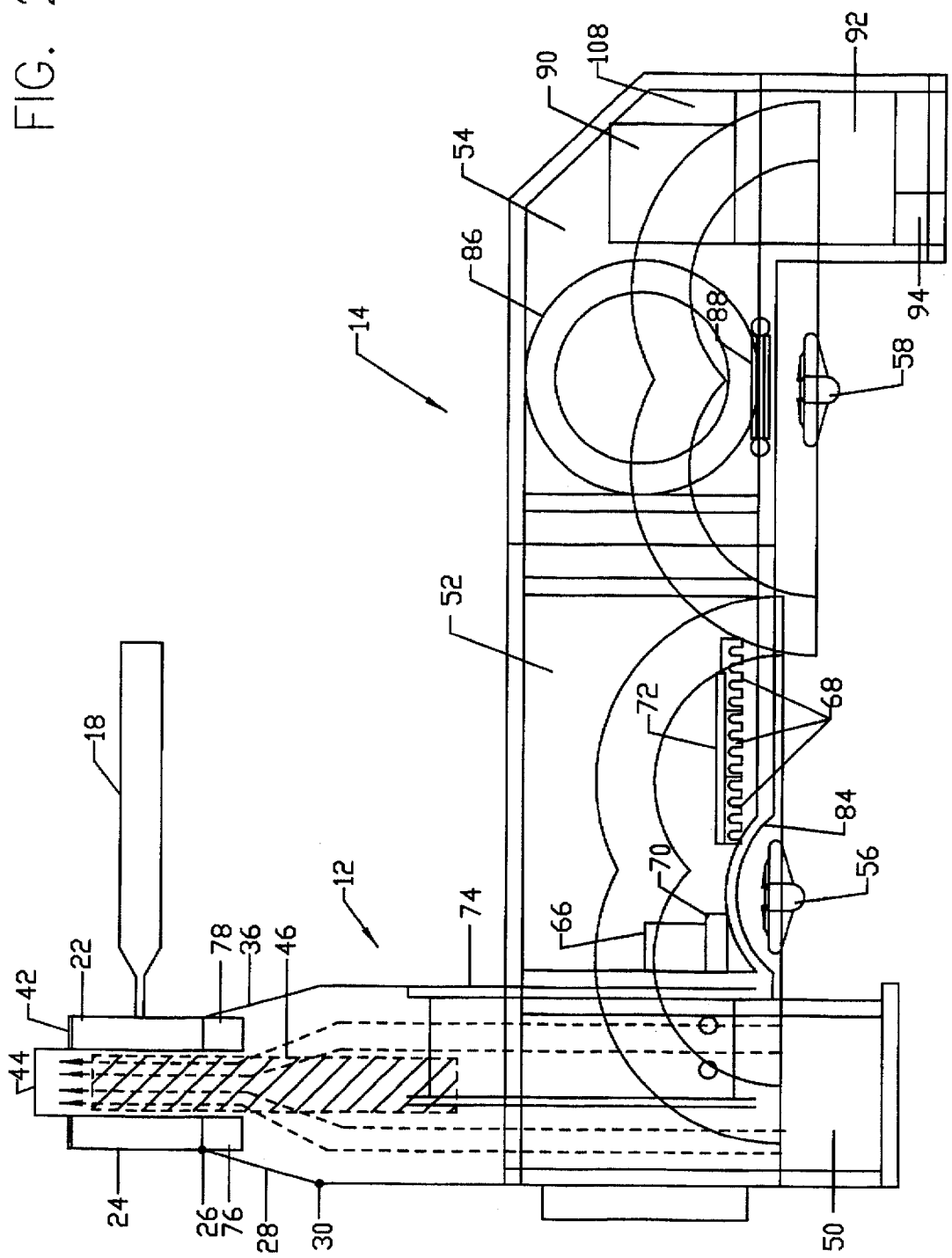

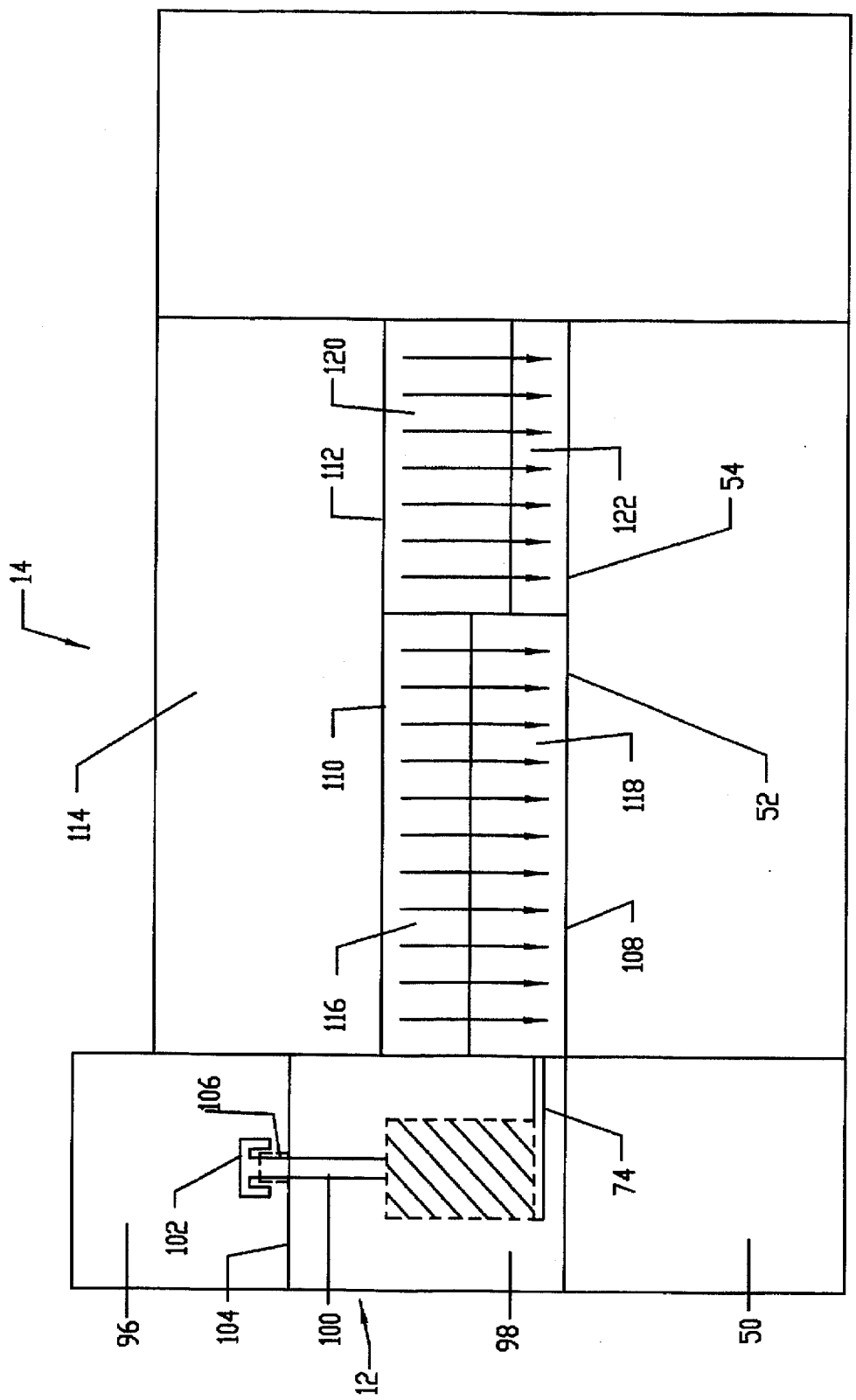

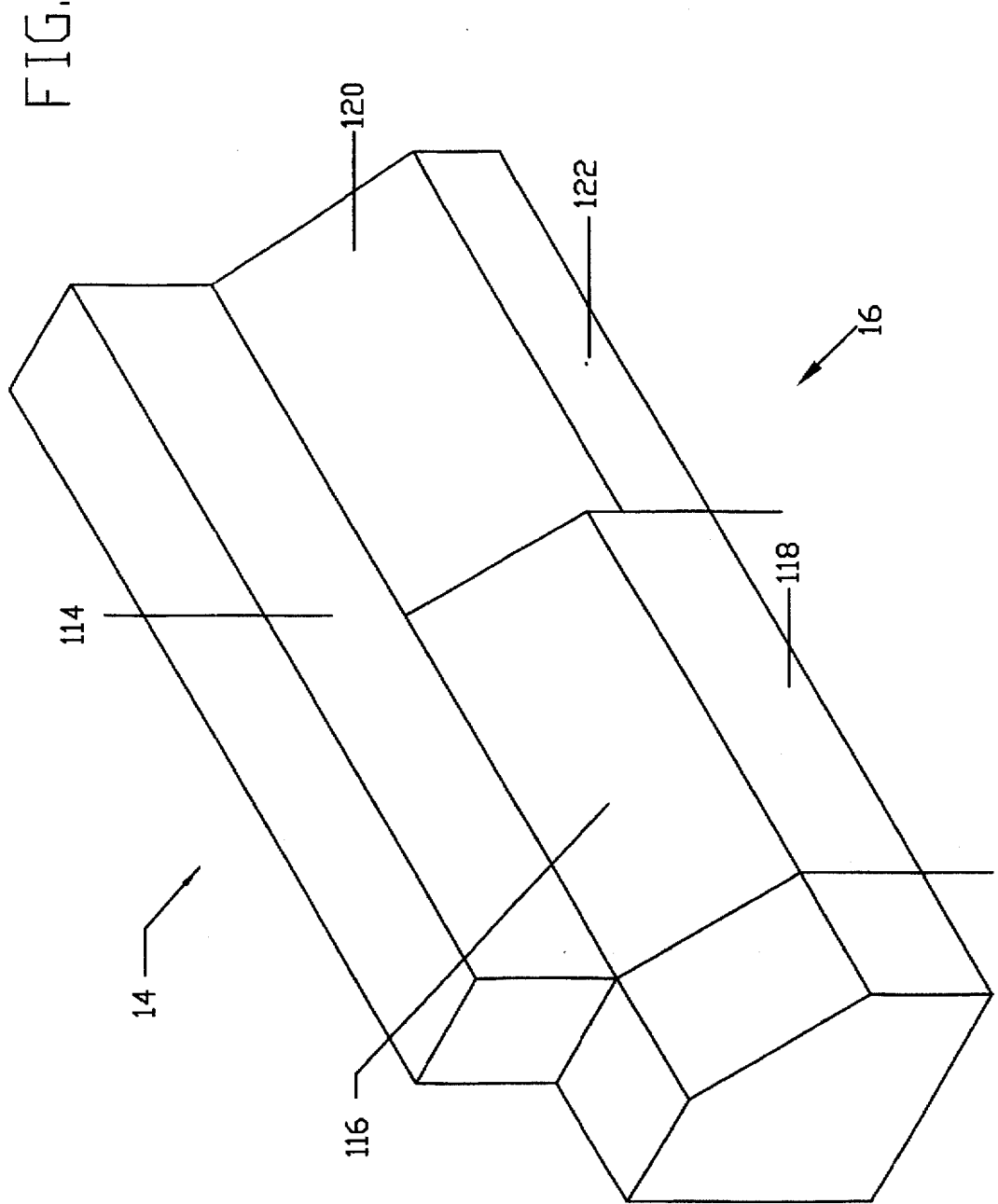

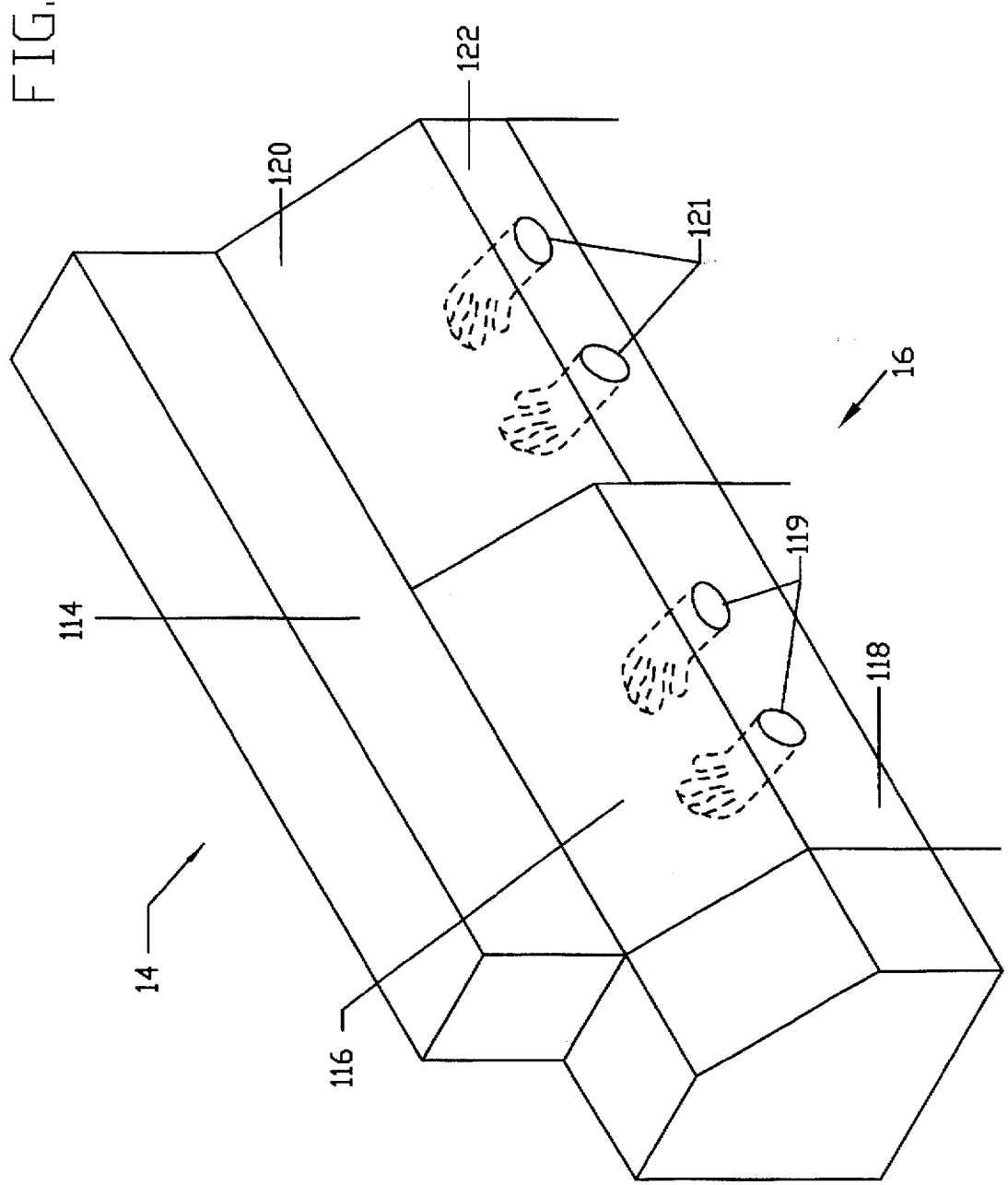

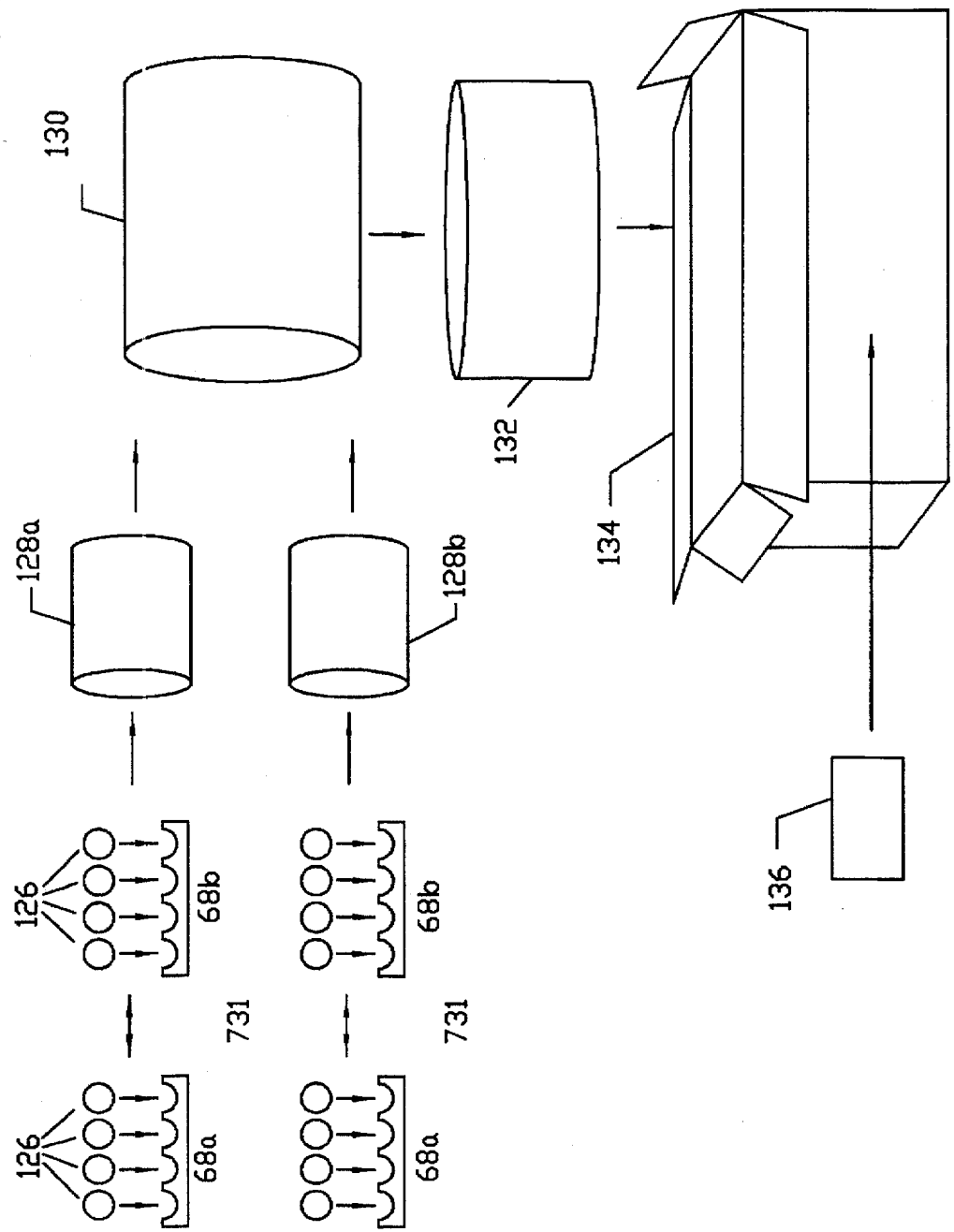

ISOLATION MODULE FOR MOLDING AND PACKAGING ARTICLES SUBSTANTIALLY FREE FROM CONTAMINANTS

TECHNICAL FIELD OF THE INVENTION

This invention relates in general to manufacturing articles substantially free from contaminants, and more particularly relates to apparatus and methods for molding and packaging articles, such as syringe barrels, in a molding and packaging isolation module, substantially free from contaminants.

BACKGROUND OF THE INVENTION

Manufacturing processes for prefilled syringes are known in the art. For example, processes are known for producing prefilled, sterile glass syringes whereby the manufactured syringe components are washed and sterilized prior to partial assembly. The partially assembled glass syringe is filled with a fluid, sealed with a plunger, and sterilized once again by heating. U.S. Pat. Nos. 4,718,463 and 4,628,969, both issued to Jurgens, Jr. et al., teach a process for manufacturing plastic, prefilled syringes using repeated water jet washing of the syringe components prior to assembly and filling. Water washing is expensive because it requires ultra-purified water. Water washing is also troublesome because it is difficult to inspect and ensure satisfactory cleaning. Therefore, it is desirable to reduce the number of washing steps required in the manufacture of prefilled syringes. Further, prior art syringe manufacturing processes do not provide precautionary steps to maintain syringe components substantially free from contaminants, such as viable and nonviable particles, during molding, assembly and filling. Therefore, it is desirable to develop a method for manufacturing prefilled syringes which substantially reduces viable and nonviable particles that may contaminate the syringe components during molding, assembly and filling.

SUMMARY OF THE INVENTION

The present invention provides an apparatus and method for manufacturing articles, such as syringe barrels, substantially free from contaminants, such as viable and non-viable particles. In a preferred embodiment, the apparatus includes a molding isolation module and a packaging isolation module located within an enclosure, preferably defining a class 100 environment and a class MCB-3 environment. A class 100 environment, as used herein, is defined as an environment having no more than 100 viable or nonviable particles per cubic foot of air, 0.5 microns and larger. A MCB-3 environment, as used herein, is defined as an environment wherein the microbial level of gram positive microorganisms is less than 3 cfu (colony forming unit) per cubic foot of air, and the microbial level of gram negative microorganisms is less than 1 cfu per cubic foot of air.

In a preferred embodiment, the molding process is used within the molding isolation module generates enough heat to render the molded articles substantially free from contaminants. Thereafter, any contaminants generated inside or outside the enclosure is diverted by air flow in such a way that the articles remain substantially clean. In another preferred embodiment, the molding isolation module contains a gas which sterilizes and maintains the cleanliness of the molded articles. In the preferred embodiments, airborne contaminants are swept through air filters and out of the enclosure at a sufficient speed that the airflow inside the enclosure is laminar. In one area of the enclosure, where preferably no humans are employed, the airflow is arranged to be horizontal. In those areas of the enclosure to which human personnel have access, the airflow is vertical.

The molded articles are created using a typical injection molding process. The material flows through injection gates to mold platens located within the molding isolation module. A robot or mechanical arm within the molding isolation module retrieves the molded articles from the platens and places them on a conveyor. The robot workspace has a horizontal laminar airflow with the air being drawn from outside the molding isolation module through a high-efficiency particulate air (HEPA) filter. This air is subsequently dumped to the outside of the molding isolation module, carrying with it any contaminants generated within the molding isolation module. The laminar nature of the airflow minimizes the settling of contaminants on the articles.

The conveyor leads to an inspection station within the packaging isolation module, manned by a human worker, where the articles are inspected. Preferably, the articles are placed into a class 100 molded holder at this step. A laminar airflow at this stage proceeds vertically top down and is circulated through a HEPA filter.

The articles are passed to a packaging station within the packaging isolation module at which the articles are packaged within containers themselves substantially free from contaminants. Packaging supplies are kept within the packaging isolation module.

While the process and enclosure are described herein with respect to syringe barrels, they have application to any article, container or component which is molded using a heated process, where it is desired that such article be maintained substantially free from contaminants. Thus, other syringe components, other parts for medical use or other articles which must be substantially free from contaminants can be manufactured using the apparatus and process of the invention. As applied to syringes, the process could be modified to include filling and assembly steps to complete the assembly and packaging of prefilled syringes ready for use.

The present invention confers a technical advantage in that cumbersome and expensive decontamination apparatus, such as washing apparatus is not required. Instead, a relatively simple enclosure, fans or other air forcing apparatus, and filters are employed. The maintenance of cleanliness is made more human-friendly as there is a decrease in possibility of exposure to dangerous temperatures or chemicals. Finally, the present invention is energy-efficient in that the same heat source used to mold the articles is used to render the articles substantially free from contaminants.

BRIEF DESCRIPTION OF THE DRAWINGS

FIG. 2 is a schematic plan view of a second embodiment of the invention showing the mold platens of the molding module in an open position;

FIG. 4 is a front elevational view of the enclosure of FIG. 2 showing top-to-bottom laminar airflow with arrows;

FIGS. 5a and 5b are isometric views of a packaging isolation module of the invention having open access slots and glove ports, respectively;

FIG. 6 is a schematic diagram showing successive steps in a packaging process according to the invention.

DETAILED DESCRIPTION

Figure 1:
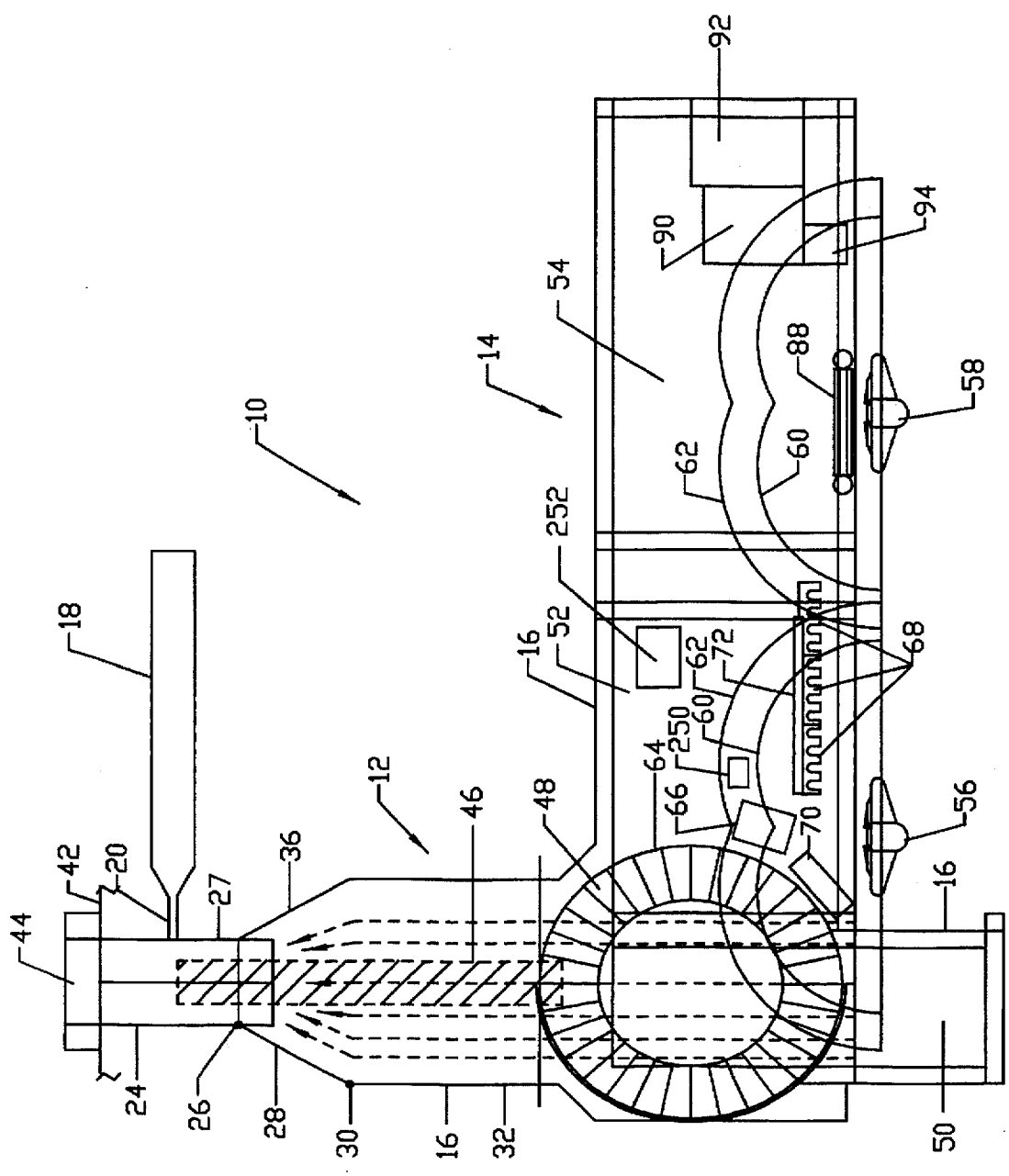
FIG. 1 is a schematic plan view of a first embodiment of the invention showing the mold platens of the molding module in a closed position.

A first embodiment of the article molding and packaging enclosure 10 of the invention is shown in FIG. 1. Enclosure 10 defines an environment substantially free from contaminants, such as viable and non-viable particles. In a preferred embodiment, enclosure 10 defines at least a class 100 environment and at least a MCB-3 environment. Enclosure 10 includes two main components, a molding isolation module indicated generally at 12, and a packaging isolation module indicated generally at 14. Enclosure 10 is preferably fabricated using stainless steel panels and tubes to form a plurality of sidewalls 16, and is preferably on castors (not shown) which permit movement of the enclosure 10 when unlocked and which remain stationary when locked.

Figure 3A:
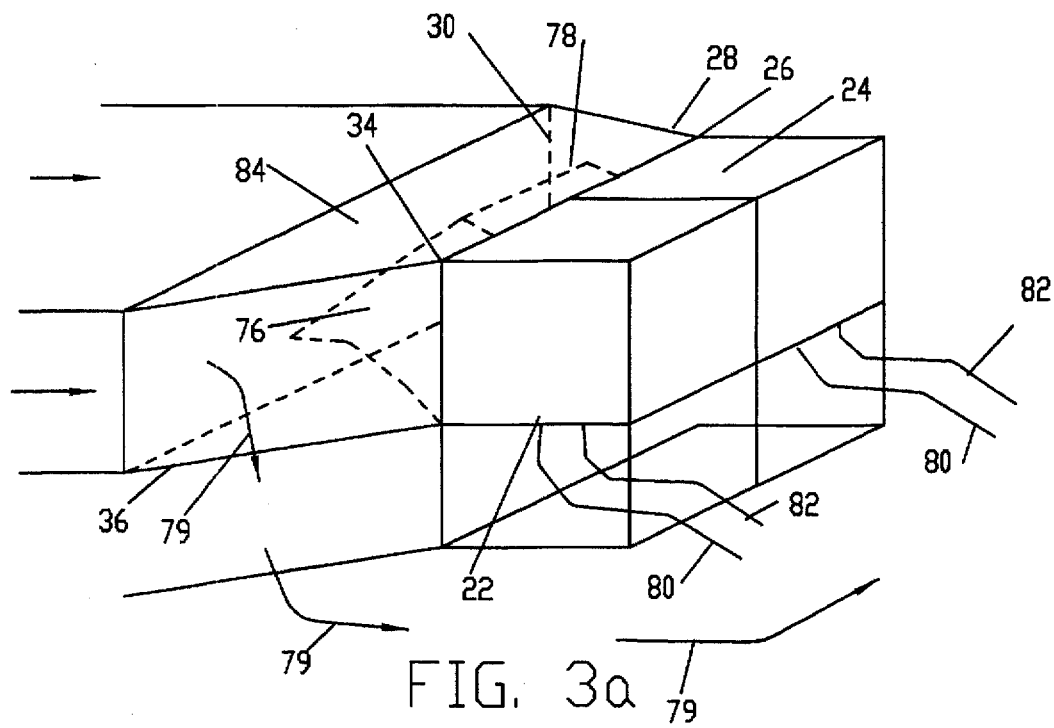
FIGS. 3a and 3b are isometric views of a portion of the molding module according to the invention showing the mold platens in a closed and open position, respectively.
Figure 3B:
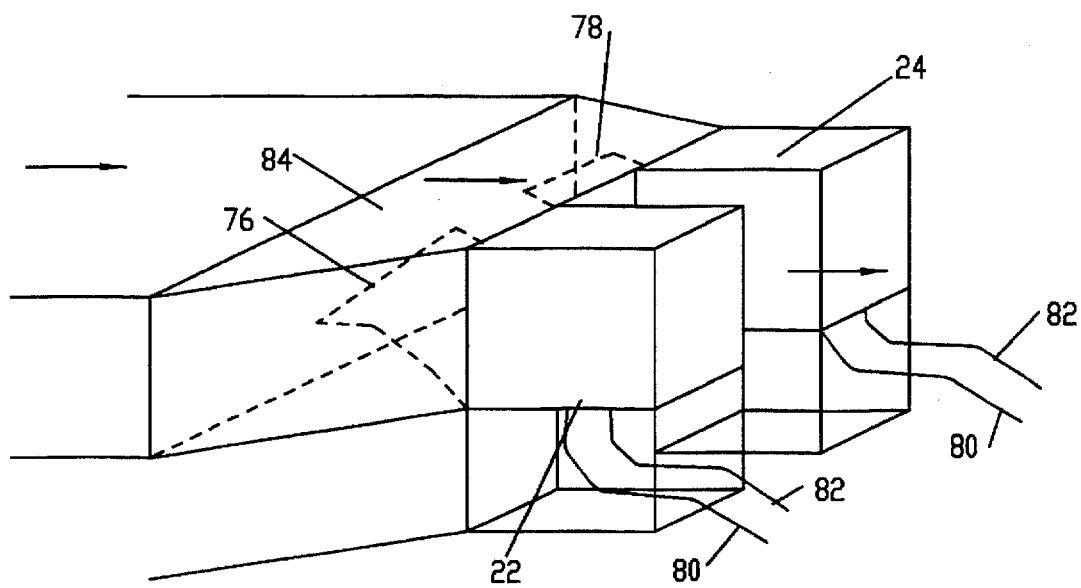

An injection molding machine 18 connected to the molding isolation module 12 is filled with a material from which articles are to be molded. In a preferred embodiment, the material is plastic pellets used to manufacture syringe barrels. The injection molding machine 18 is basically a robe with a screw conveyor and heating elements (not shown) disposed around the tube. A from end 20 of the injection molding machine 18 communicates with the interior of a first mold platen 22 located within the molding isolation module 12. The mold platen 22 and a corresponding mating mold platen 24 (also located within the molding isolation module 12) together form a mold for a plurality of articles to be fabricated, such as syringe barrels. The mold platens 22 and 24 also are supplied with heating wires 80 and cooling tubes 82, as shown in FIGS. 3a and 3b, and more fully described below.

While the illustrated embodiments of the invention employ a molding process in which electric heat is used to melt thermoplastic pellets, the invention is not limited to thermoplastic processes or even to organic materials. The invention has application to any fabrication process which generates enough heat to render the articles fabricated substantially flee from contaminants. For example, the process can be used in conjunction with articles made of thermosetting polymers, glass, ceramics or even metals. The invention also has application to processes where the temperature is not high enough to render the fabricated article substantially free from contaminants, but where it is desirable to keep the articles substantially free from contaminates by using sterilizing gas in the molding isolation module 12.

As shown in FIG. 1, the mold platens 22 and 24 in their closed position, occupy a terminal end of the molding isolation module 12. Mold platen 24 is connected via a vertical hinge 26 to a stainless steel panel 28, which in turn is connected by a vertical hinge 30 to a further stainless steel panel 32. Mold platen 22 is connected to side wall 36 and the injection molding machine 18, and remains fixed during operation. Plastic is injected into mold platens 22 and 24 while the mold platens 22 and 24 are in a closed position. After the articles have cooled sufficiently, mold platen 24 is moved away from mold platen 22. Hinges 26 and 30 bend and plate 28 shortens to allow platen 24 to move. Plate 28 is made from two pieces of overlapping material, with a sliding seal, for example, commercially available Teflon®, to prevent air leakage. The top and bottom edges of plate 28 also have a sliding seal to the top and bottom of the molding isolation module 12. An end sidewall 42 of the molding isolation module 12 includes an exhaust opening in adjacency to the platens 22 and 24.

A robot (not shown) moves about inside of a work envelope within the molding isolation module 12 represented by the dashed rectangle 46. Alternatively, the robot may be replaced with a mechanical arm (not shown) which is capable of traversing the work envelope 46. When the mold platens 22 and 24 are opened, as shown in FIG. 2, the robot picks or retrieves the molded articles, such as syringe barrels out of the mold, travels down to the other end of the molding isolation module 12, and deposits the molded articles on a circular carousel 48. The molded syringe barrels or other articles travel on the carousel 48 which rotates around to the packaging isolation module 14 for further processing.

In one embodiment of the invention, the injection molding machine 18 and the mold platens 22 and 24 generate sufficient heat to render the melted plastic being molded therein, substantially flee from contaminants, thus, avoiding the necessity for decontaminating the molded articles by any suitable means such as autoclaving, or ultrasonic or repeated jet washing with ultra-purified water or freon. The only contaminant source is external to the articles themselves.

To keep contaminants from settling on the molded articles, a preferably horizontal, laminar airflow is set up inside the molding isolation module 12. Enclosure 10 is preferably placed inside of a class 100,000 environment defined herein as an environment having no more than 100,000 viable or nonviable particles per cubic foot of air, 0.5 microns and larger. The direction of air flow within the molding isolation module 12 is from the end containing the carousel 48 to the end at which are disposed platens 22 and 24, as shown by the dashed arrows.

In a preferred embodiment, the air source at the end of the isolation module 12 is a HEPA (high efficiency particle arresting) unit positioned at 50. The HEPA filter unit 50 draws in air from the surrounding class 100,000 environment, filters it and blows the air in horizontal laminar fashion down the mold isolation module 12 toward the platens 22 and 24. The HEPA filter 50 includes an independent blower, preferably having a capacity of at least 4,000 cubic feet per minute (cfm) at 500 feet per minute (fpm). Alternatively, filter 50 may be an ultra low penetration air (ULPA) filter.

The HEPA unit 50 must develop sufficient velocity and volume to fully envelop the molded articles when the mold platens 22 and 24 are open, as shown in FIG. 2, and when the articles are transferred to the packaging isolation module 14. At a minimum, the airflow proximate the platens 22 and 24 should have a velocity of 100 fpm, a throughput 1400 cfm and be horizontally laminar. All HEPA filters employed should be at least 99.97% efficient. The entire enclosure 10 should operate at a positive minimum 0.5" w.c. pressure relative to the ambient pressure of the class 100,000 environment in which the enclosure 10 is placed. Baffles or partitions (not shown) having a minimum opening area separate the airflow in the molding isolation module 12 from the packaging isolation module 14 (i.e. a slotted window, for the operator to reach the articles). As shown in FIG. 1, carousel 48 carries the articles from the molding isolation module 12 to the packaging isolation module 14, and the operator does not need to reach into the molding isolation module 12.

In a preferred embodiment of the invention, as shown in FIG. 1, the packaging isolation module 14 includes two stations manned by human personnel, an inspection station indicated generally at 52 and a packaging station indicated generally at 54. Stations 52 and 54 are partially enclosed by sidewalls, but have either access slots or gloved ports, as more fully described below, to permit access by the hands and arms of an inspector 56 and a packager 58. The range of arm reach of the inspector 56 and of the packager 58 are indicated by dotted arcs 60 and 62.

The carousel 48 includes a curb 64 such that a plurality of molded articles can accumulate against it. The articles, such as syringe barrels, are picked up by the inspector 56 and inspected for defects. Any runners, scrap and rejects from the injection molding process are disposed of in a waste bin 66 adjacent, or underneath, a syringe barrel accumulator (not shown).

A plurality of barrel holders, such as the ones shown at 68, each hold four different syringe barrels and are sourced at a barrel holder magazine 70 which is located adjacent the carousel 48. The holders 68 had been made previously in this or a similar enclosure, and packaged in at least class 100 conditions. The holders 68 are placed in a horizontal rail 72 to facilitate insertion of the barrels. The rail 72 also facilitates transfer of each barrel holder 68 to the packaging station 54 after the barrels (not shown) have been inserted. The packager 58 inserts two linked clips 68 of barrels, for a total of 8 barrels, into a first container, such as a plastic bag. Further packaging steps are discussed below in conjunction with FIG. 6. The airflow inside the packaging module 14 is vertical from top to bottom, as discussed below in conjunction with FIG. 4.

FIG. 2 illustrates another embodiment of the invention in which the carousel 48 has been replaced with a conveyor 74. Otherwise, like elements are identified by like characters in FIGS. 1 and 2. In FIG. 2, the mold platens 22 and 24 are shown in an open position, permitting the horizontal laminar airflow shown by dashed arrows to go between the platens 22 and 24.

The articulation of platens 22 and 24 between the open and closed positions is more particularly illustrated by the isometric, schematic diagrams shown in FIGS. 3a and 3b. FIG. 3a corresponds to the positions of platens 22 and 24 as shown in FIG. 1. In this position, the platens 22 and 24 are forced together by any suitable mechanism, such as a hydraulic or motor-driven apparatus (not shown), blocking off direct access to the exhaust opening in sidewall 42. Platen 22 has affixed into its from end a baffle 76, indicated in FIGS. 3a and 3b in phantom, which has a curved surface that curves downwardly from a forward, horizontal position to a rearward, vertical position. Platen 24 has a baffle 78 that is similar in shape to baffle 76 and which, when the platens 22 and 24 are moved together, forms a continuous surface therewith. The baffles 76 and 78 act to redirect the horizontal laminar airflow downwardly through appropriate ductwork in the floor, indicated schematically by the arrows 79. This duct work leads to the exhaust into the class 100,000 environment.

FIG. 3b illustrates the condition of the platens 22 and 24 after an injection molding and cooling operation has been completed. The platens 22 and 24 are separated from each other in the center, permitting the horizontal laminar airflow to pass between them into the exhaust opening in end wall 42 shown in FIGS. 1 and 2. As separated, the baffles 76 and 78 no longer redirect all of the airflow. Some of the air continues horizontally over the platens 22 and 24, maintaining cleanliness of the molded articles. Each platen 22 and 24 is equipped with heating wires 80 for electrical heating current and cooling tubes 82 for the circulation of cooling fluid in order to control the temperature in platens 22 and 24. A top, trapezoidal stainless steel panel 84 prevents escape of the filtered air into the class 100,000 environment.

Returning to FIG. 2, the embodiment illustrated therein also differs from the embodiment shown in FIG. 1 in providing an accurately curved front sidewall 84 to allow the forward positioning of the inspector 56 and to give him or her a concomitantly greater reach. The packaging station 54 is equipped with a turntable 86, indicated in dotted line in FIG. 2, and a bag sealing device 88 positioned immediately in front of the packager 58. The packaging station 54 is also provided with packaging supplies including first containers 90, such as plastic bags, and second containers 92, such as plastic bags, and labels 94, all contained in respective receptacles. The packaging supplies are used to preserve the cleanliness of the articles as they leave the enclosure and are transported to a different work area.

A schematic elevational side view of the enclosure 10 shown in FIG. 2 is illustrated in FIG. 4. The molding isolation module 12 is provided with a robot superstructure dear area 96 which is located above a molding/transfer volume 98. In the embodiment illustrated in FIG. 4, the robot (not shown) is suspended on an arm 100, which in turn is suspended from a channel 102 affixed inside of the robot clear area 96. A stainless steel panel 104 between the robot rail 102 and the molding volume 98 will provide the air containment for the top of the tunnel 98. A slot indicated schematically at 106 is cut out for the travel path of the robotic arm 100. This configuration minimizes any contaminants generated from the robot travel or from the channel 102 from entering the class 100 air stream in volume 98.

The belt conveyor 74 is preferably supplied with a direct drive (not shown) and plastic cleats (not shown). The conveyor 74 drops off articles, such as syringe barrels, at a point approximately twelve inches above the level of a packaging station work surface 108. The packaging module work surface 108 is raised approximately 13 inches from the standard 30 inches to 43 inches above floor level. This dimension is specified to accommodate the limited vertical travel of the robotic arm 100. The inspector 56 and the packager 58 may sit at their respective stations 52 and 54, and/or may be placed on platforms as necessary, to take the nonstandard work surface height into account.

An accumulator (not shown) is provided at the end of the conveyor 74 to accommodate irregularities in inspection of packaging cycles. Preferably, two segments of the conveyor (not shown) open directly beneath the syringe barrels, and will be slightly higher to gently lower the syringe barrels onto the accumulator to prevent scuffling the barrel rims. This feature will also permit runners to drop off into a waste bin below.

As mentioned earlier, the packaging isolation module 14 has a vertical, top-to-bottom laminar airflow, as illustrated in FIG. 4 by the vertical arrows. The work surface panels 108 are constructed of perforated stainless steel sheeting with approximately 40% open perforated space. This permits the purging of all air from the packaging isolation module 14 and contributes to reduced turbulence. It is preferred that the work surface panels making up the work surface 108 be removable to facilitate cleaning.

FIG. 4 further shows that disposed above respective inspection and packaging work volumes 110 and 112 is one or more individual self-powered HEPA fan units contained within volume 114. Space 114 also includes lighting fixtures (not shown) to illuminate the work volumes 110 and 112. The supply air for the packaging isolation module 14 is taken from the class 100,000 environment at the top and exhausted into the class 100,000 environment at the bottom.

Inspection station 52 is equipped with a polycarbonate or other transparent panel 116, for example, commercially available Lexans®, and has an access slot 118 for the insertion of the inspector's arms and hands. Likewise, the packaging station 54 is equipped with a polycarbonate or other transparent panel 120 which leaves an access slot 122 for the insertion of the packager's arms and hands.

FIG. 5a is an isometric view of one embodiment of a packaging isolation module 14 of the invention and illustrates the location of access slots 118 and 122 which give access to the inspector 56 and packager 58, respectively. Preferably, the overhead fixture 114 includes ion bar antistatic assemblies (not shown). FIG. 5b shows a second embodiment of packaging isolation module 14 where glove units 119 and 121 are installed in access slots 118 and 122. The glove units 119 and 121 provide additional isolation for particularly stringent environmental conditions which require manipulation and access to the packaging isolation module 14 by the inspector 56 and packager 58.

The packaging process can best be understood with reference to FIGS. 2 and 6. FIG. 6 is a schematic diagram showing various steps in the packaging process. In a preferred method, four syringe barrels 126 are inserted into a holder 68a, and four syringe barrels 126 are likewise inserted into a mating syringe barrel holder 68b. The syringe barrel holders 68a and 68b are assembled into a single clip. As thus assembled, the barrel holders 68a–b and barrels 126 are transferred to the packaging station 54. The packager 58 inserts two linked clips 68a,b with eight barrels 126 (together comprising an assembly) into a first container 128a, such a plastic bag. Optionally, a label may be applied to the first container 128a. First container 128a, including the assembly, is then placed on the turntable 86, shown in FIG. 2. After packaging a second assembly in a first container 128b, the turntable 86 is rotated to align the respective first containers 128a and 128b to the seal bar 88, at such time the respective first containers 128a and 128b are sealed simultaneously. The bag seals are inspected prior to placing and preparing the second container 130, such as a plastic bag. The two bagged assemblies 128a and 128b are pushed into the second container 130 which is then pulled back onto the turntable 86. The second container 130 is then heat sealed using sealer 88 and the seal is inspected. The class 100 packaged barrels are then removed from the enclosure 10 into a less clean environment, preferably at least a class 10,000 environment. Thereafter, the second container 130 is placed inside of a third container 132 which is sealed and placed inside a shipping container 134 which is closed. A label 136 including shipping or other instructions may be applied to shipping container 134.

As shown in FIG. 2, containers 128 and 130 and labels therefor, are dispensed from respective recessed containers 90, 92, and 94 within the packaging station 54. In a preferred embodiment, containers 128 and 130, and labels therefor, are themselves triple-bagged when received from the suppliers. The outer two bags for each packaging supply will be removed prior to use. The inner bag for each supply will be removed under the laminar flow of the packaging isolation module 14. This procedure prevents contaminants from sloughing off the containers and labels onto the barrels. All packaging supplies are prepared in advance of barrel production. Preferably, the end of the barrel holder rail 72 has a stainless steel wire spreader (not shown) to facilitate the opening of the first and second containers 128 and 130, respectively. This technique for opening the containers will minimize generation of contaminant. Any contaminants generated during container opening are knocked down and expelled from the packaging isolation module 14 by the top-to-bottom laminar airflow in the packaging isolation module 14.

Figure 7:
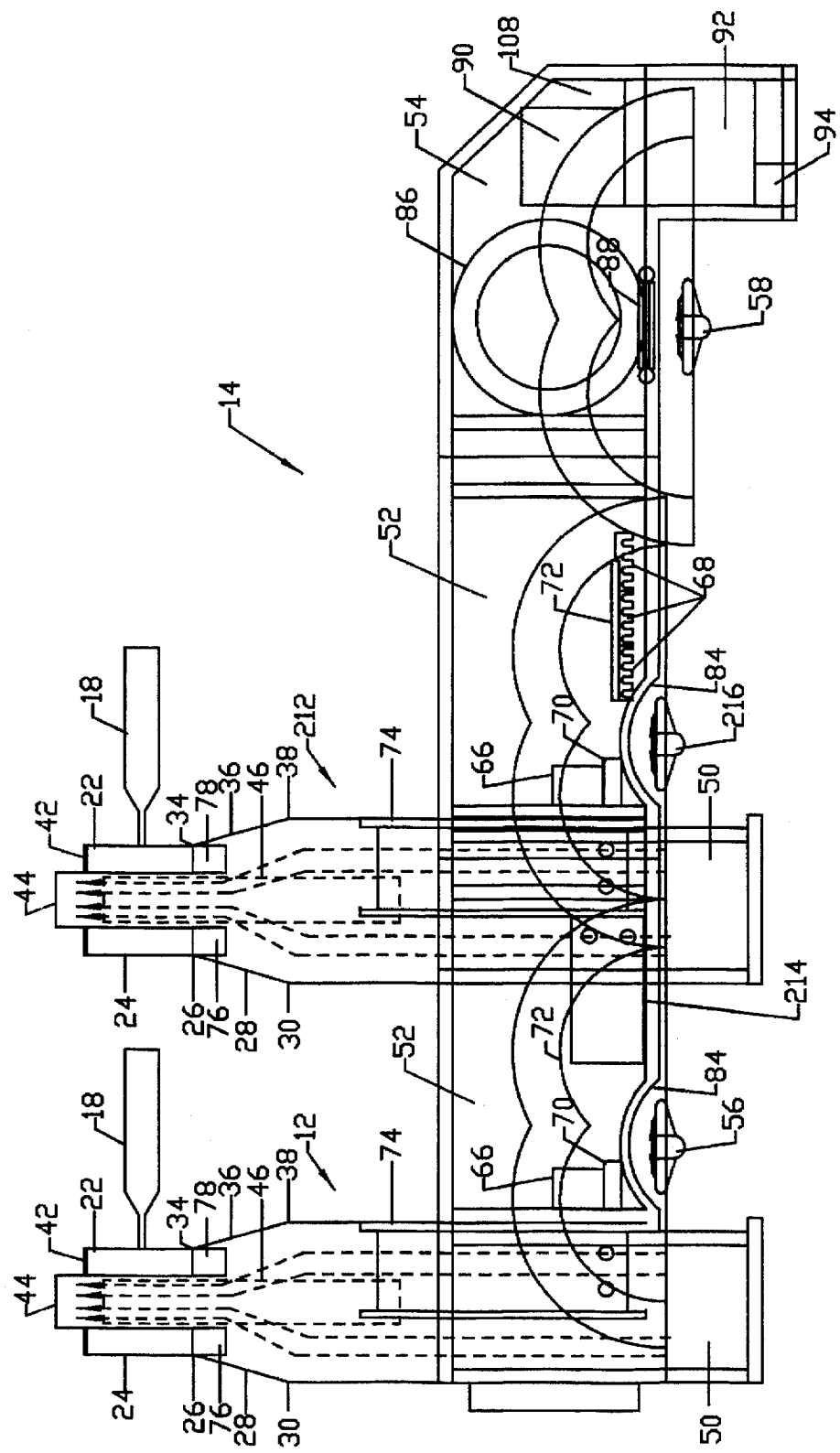
FIG. 7 is a schematic plan of coupled isolation modules used when articles are manufactured in different molds and assembled while still isolated from contaminants.

Additional manufacturing modules may be added to the above-mentioned embodiment. These additional modules allow more than one molded article to be manufactured and assembled in a clean environment. FIG. 7 shows a second molding isolation module 212 which is coupled between molding isolation module 12 and packaging isolation module 14. The second molding isolation module 212 is similar to the isolation module 12 (elements having like numerals on second module 212 being identical to those on molding isolation module 12). After inspection, articles which are produced by molding isolation module 12 are placed on conveyer 214 and join articles which are produced by second molding isolation module 212. These articles are assembled by inspector 216 and placed on barrel holder 70 in the packaging isolation module 14. It is understood that additional molding isolation modules may be inserted between second molding isolation module 212 and molding isolation module 12 or packaging isolation module 14 if additional articles are desired.

In an alternative embodiment (not shown), a further an intermediate module (not shown) may be inserted in between the inspection station 52 and the packaging station 54. This intermediate module 250 may be used for applying a lubricant, such as silicone oil, to the manufactured articles, for example, the inner barrel surfaces of the barrels 126 or other syringe components, such as tip seals (not shown). A further intermediate module 252 may be provided in between the inspection station 52 and the packaging station 54 for filling syringes with a fluid, such as a contrast medium or drug.

Another further alternative embodiment (not shown) provides sterilization for the molded pieces. In this embodiment, the molding isolation module 12 is sealed from outside air, and air is merely recirculated within molding isolation module 12. A sterilizing gas, such as ozone or ethylene oxide, is added to the interior of the molding isolation module 12. The sterilization gas sterilizes all the interior surfaces within molding isolation module 12 and maintains the sterility thereof. This embodiment may be used to sterilize molded articles when the present invention is used in a manufacturing process which does not involve temperatures high enough to render the articles substantially free from contaminants. Alternatively, a vapor phase hydrogen peroxide (VHP) spray which is applied periodically to the interior surfaces within molding isolation module 12 may be utilized instead of the sterilizing gas.

While the detailed description has been described in conjunction with syringe barrels, the process and disclosed apparatus may be used for any molded components which are desired to remain substantially free from contaminants until received and opened by the end user. The invention therefore has application to all other kinds of molded containers for medical supplies. Further, the class 100 molding and packaging module disclosed above has application to all industrial processes in which contaminants are to be minimized, as in semiconductor manufacturing processes. By relying on the heat-generating molding step at the beginning of the procedure, no later autoclaving step is necessary. The use of horizontal and vertical laminar airflows keep contaminants from settling on the fabricated articles, thereby eliminating the decontamination step typically requiring washing and drying.

Although the apparatus and manufacturing process of the invention have been described in detail for the purpose of illustration, it is to be understood that such detail is solely for that purpose and that variations can be made thereto by those skilled in the art without departing from the spirit and scope of the invention except as it may be limited by the claims.

We claim:

1. Apparatus for manufacturing and packaging a plurality of articles substantially free from contaminants, the apparatus comprising:
   a first enclosure defining an environment;
   a second enclosure containing air and defining an environment of at least class 100,000, wherein said second enclosure contains said first enclosure and the environment of said first enclosure is cleaner than the environment of said second enclosure;
   an air filter disposed between said first enclosure and said second enclosure to filter air from the second enclosure before such air enters the first enclosure;
   at least one molding module located in said first enclosure, said molding module including at least one mold for molding the articles; and
   at least one packaging module located in said first enclosure for packaging the molded articles.

2. The apparatus of claim 1 further comprising an air flow producing device to produce laminar air flow through said air filter and through said first enclosure to remove contaminants from said first enclosure.

3. The apparatus of claim 2 wherein the laminar air flow within the said first enclosure is horizontal laminar air flow.

4. The apparatus of claim 1 wherein said at least one mold includes heat-generating means operable to render the molded articles substantially free from contaminants.

5. The apparatus of claim 1 further including at least one molding machine containing molding material, said at least one molding machine located within said second enclosure and connected to said at least one molding station by an injection molding gate coupled to said at least one mold, wherein said injection molding gate forces the molding material into said at least one mold and includes heat-generating means operable to render said molding material substantially free from contaminants.

6. The apparatus of claim 1 wherein said first enclosure is at least a class 100 environment.

7. The apparatus of claim 1 wherein said first enclosure is at least a MCB-3 environment.

8. The apparatus of claim 1 wherein said mold is a plastic injection mold.

9. The apparatus of claim 1 further comprising means for removing the molded articles from the mold.

10. The apparatus of claim 8 wherein said removing means comprises a robot located within said first enclosure.

11. The apparatus of claim 8 wherein said removing means comprises a mechanical arm located within said first enclosure.

12. The apparatus of claim 1 wherein said first enclosure further includes at least one inspection station, and a conveyor disposed between said at least one molding module and said at least one inspection station.

13. The apparatus of claim 1 wherein said first enclosure further includes at least one inspection station and means for creating a substantially vertical laminar air flow at said at least one inspection station.

14. The apparatus of claim 1 further comprising means for creating a substantially vertical laminar air flow within said at least one packaging module.

15. The apparatus of claim 1 wherein said articles are syringe barrels.

16. The apparatus of claim 1 wherein said first enclosure includes at least one inspection station located intermediate said at least one molding module and said at least one packaging module, and at least one holder magazine disposed at said at least one inspection station for supplying a plurality of article holders.

17. The apparatus of claim 16 further comprising a holder rail disposed between said at least one inspection station and said at least one packaging module, said holder rail adaptable to hold and transfer a plurality of said article holders.

18. The apparatus of claim 1 wherein the first enclosure further comprises at least one inspection station intermediate said at least one molding module and said at least one packaging module, said at least one inspection station including at least one article accumulator for accumulating molded articles pending inspection.

19. The apparatus of claim 1 wherein the first enclosure further comprises at least one inspection station located intermediate said at least one molding module and said at least one packaging module, and a sidewall at said at least one inspection station including a transparent panel such that the articles may be inspected from outside of the first enclosure.

20. The apparatus of claim 19 wherein said sidewall of said first enclosure defines an opening below said transparent panel for the ingress of the arms of an inspector to remove scrap from the molded articles and to reject defective ones of the molded articles.

21. The apparatus of claim 19 wherein said sidewall of said first enclosure defines an opening containing access to a glove unit capable of allowing the arms of an inspector in to remove scrap from the molded articles and to reject defective ones of the molded articles without physically contacting said molded articles.

22. The apparatus of claim 1 wherein said first enclosure further includes a sidewall disposed adjacent said packaging module, and a transparent panel in said sidewall permitting the observation of packaging of the molded articles.

23. The apparatus of claim 22 wherein said sidewall further includes an opening below said transparent panel for the insertion of an arm of a packager into the first enclosure in order to perform a packaging operation.

24. The apparatus of claim 22 wherein said sidewall further includes an opening containing access to a glove unit for the insertion of an arm of a packager into the first enclosure in order to perform a packaging operation.

25. The apparatus of claim 1 wherein said packaging module includes means for keeping a plurality of bags inside said first enclosure, said bags used to package said molded articles, and means for sealing said bags.

26. The apparatus of claim 1 wherein said packaging module includes a perforated work surface, said apparatus further including means for forcing a substantially vertical laminar air flow through said perforations in said work surface.

27. The apparatus of claim 1 wherein the mold comprises a first platen and a second platen mateable with said first platen, means for bringing together said first platen and said second platen prior to molding articles therein, means for spacing apart said first and second platens from each other after molding in order to extract molded articles;

and wherein the apparatus further comprises;
  means for forcing cleaned air through said molding module in order to remove contaminants;
  an opening in an end wall located adjacent said first and second platens for receiving air forced through said molding module while said first and second platens are spaced apart; and
  a conduit located adjacent said first and second platens for receiving air forced through said molding module when said first and second platens are brought together.

28. The apparatus of claim 27 further comprising means mounted on said first and second platens for diverting said air into said conduit.

29. The apparatus of claim 1 further comprising a lubrication module located intermediate said molding module and said packaging module.

30. The apparatus of claim 1 further comprising a filling module located intermediate said molding module and said packaging module.

* * * * *